US012793536B2

(12) United States Patent
Johnson et al.

(10) Patent No.: US 12,793,536 B2

(45) Date of Patent: Nov. 10, 2026

(54) LOCATING AND IDENTIFYING REMOTE CONTROLS

(71) Applicant: ROKU, INC., San Jose, CA (US)

(72) Inventors: Neil Johnson, Cambridge (GB); Frank Maker, Livermore, CA (US); Carl Sassenrath, Ukiah, CA (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 18/234,979

(22) Filed: Aug. 17, 2023

(65) Prior Publication Data

US 2025/0061799 A1 Feb. 20, 2025

(51) Int. Cl.

| | |
|---|---|
| ***G08C 17/02*** | (2006.01) |
| ***G01S 13/75*** | (2006.01) |
| ***H04L 27/14*** | (2006.01) |

(52) U.S. Cl.

CPC ............ *G08C 17/02* (2013.01); *G01S 13/751* (2013.01); *H04L 27/14* (2013.01); *G08C 2201/30* (2013.01)

(58) Field of Classification Search

CPC ... G08C 17/02; G08C 2201/30; G01S 13/751; H04L 27/14

See application file for complete search history.

(56) References Cited

U.S. PATENT DOCUMENTS 4,631,527 A * 12/1986 De Witt ................. G08B 25/10 340/539.3

5,686,887 A * 11/1997 Chen .................. G06K 19/0723 340/12.54

2002/0070855 A1* 6/2002 Hwang .................. G08B 21/24 340/539.12

(Continued)

FOREIGN PATENT DOCUMENTS

CN 2359724 Y * 9/1998

CN 209949315 U * 1/2020

(Continued)

OTHER PUBLICATIONS

Extended European Search Report for European Application No. EP24194794.4 mailed on Jan. 13, 2025, 9 pages.

*Primary Examiner* — Michael Lee

(74) *Attorney, Agent, or Firm* — Sterne, Kessler, Goldstein & Fox P.L.L.C.

(57) ABSTRACT

Disclosed herein are system, apparatus, article of manufacture, method and/or computer program product aspects, and/or combinations and sub-combinations thereof, for locating a remote control. An example aspect operates by transmitting an encoded radio frequency to wake-up a proximate television remote and initiate a “find my remote” process. A passive circuit integrated within the television remote receives the transmitted encoded radio frequency signal. Once awake, the television remote may provide an indicator of location to a proximate user. Another example aspect operates by transmitting high frequency radar to a radar transponder circuit within the television remote so that it becomes visible to the radar. Once the transponder is activated, the radar may locate the television remote relative to the television and display the location of the television remote on-screen, on a mobile device screen, or other locator indicator constructs.

17 Claims, 11 Drawing Sheets

(56) References Cited

U.S. PATENT DOCUMENTS

| | | | | |
|---|---|---|---|---|
| 2004/0229585 | A1* | 11/2004 | Lu | H03D 11/02 455/215 |
| 2005/0007251 | A1 | 1/2005 | Crabtree et al. | |
| 2010/0079106 | A1* | 4/2010 | Graham | G06F 1/1698 381/394 |
| 2022/0180727 | A1 | 6/2022 | Murphy | |
| 2023/0394951 | A1* | 12/2023 | Jeong | H04W 4/023 |
| 2024/0121463 | A1* | 4/2024 | Hernandez | H04N 21/4221 |

FOREIGN PATENT DOCUMENTS

| | | | | |
|---|---|---|---|---|
| JP | H1079987 | A | * | 3/1998 |
| JP | 3550791 | B2 | * | 8/2004 |
| KR | 2000060314 | A | * | 10/2000 |

* cited by examiner

LOCATING AND IDENTIFYING REMOTE CONTROLS

BACKGROUND

Field

This disclosure is generally directed to remote controls and more particularly to locating television remote controls.

SUMMARY

Provided herein are system, apparatus, article of manufacture, method and/or computer program product aspects, and/or combinations and sub-combinations thereof, for locating remote controls by implementing transmitted signals, such as radio or RADAR (RAdio Detecting And Ranging, hereafter radar) frequency technology.

In an example aspect, the technology disclosed herein operates by a transmitter, located within a media device, such as a television, transmitting an encoded radio frequency to wake-up a proximate remote control (e.g., a television remote control) and initiate a "find my remote" process. For example, a passive circuit integrated within the remote control receives the transmitted encoded radio frequency signal and powers on the remote control. Once awake, the remote control may provide an indicator of location to a proximate user. The indicator of location may be an aural or visual indicator, or both, of the location of the remote control to assist the user in locating it.

In another example aspect, the technology disclosed herein operates by a radar transceiver, located within a media device, such as a television, transmitting a high frequency radar signal to a radar transponder circuit within a remote control (e.g., television remote control) so that it becomes visible to the radar. Once the radar transponder is activated, the radar transceiver may locate the remote control relative to the television, based on a returned radar echo, and display the location of the remote control on-screen, on a mobile device screen, or other display devices.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product aspects, and/or combinations and sub-combinations thereof, for locating remote controls.

In an example aspect, the technology disclosed herein operates by a transmitter, located within a media device, such as a television, transmitting an encoded radio frequency to wake-up a proximate remote control (e.g., a television remote control) and initiate a "find my remote" process. For example, a passive circuit integrated within the remote control receives the transmitted encoded radio frequency signal and powers on the remote control. Once awake, the remote control may provide an indicator of location to a proximate user. The indicator of location may be an aural or visual indicator, or both, of the location of the remote control to assist the user in locating it.

In another example aspect, the technology disclosed herein operates by a radar transceiver, located within a media device, such as a television, transmitting a high frequency radar signal to a radar transponder circuit within a remote control (e.g. television remote control) so that it becomes visible to the radar. Once the radar transponder is activated, the radar transceiver may locate the remote control relative to the television, based on a returned radar echo, and display the location of the remote control on-screen, on a mobile device screen, or other display devices. Throughout the descriptions herein, the phrases or terms, "remote control", "remote" and "television remote control" are considered interchangeable.

Figure 1:
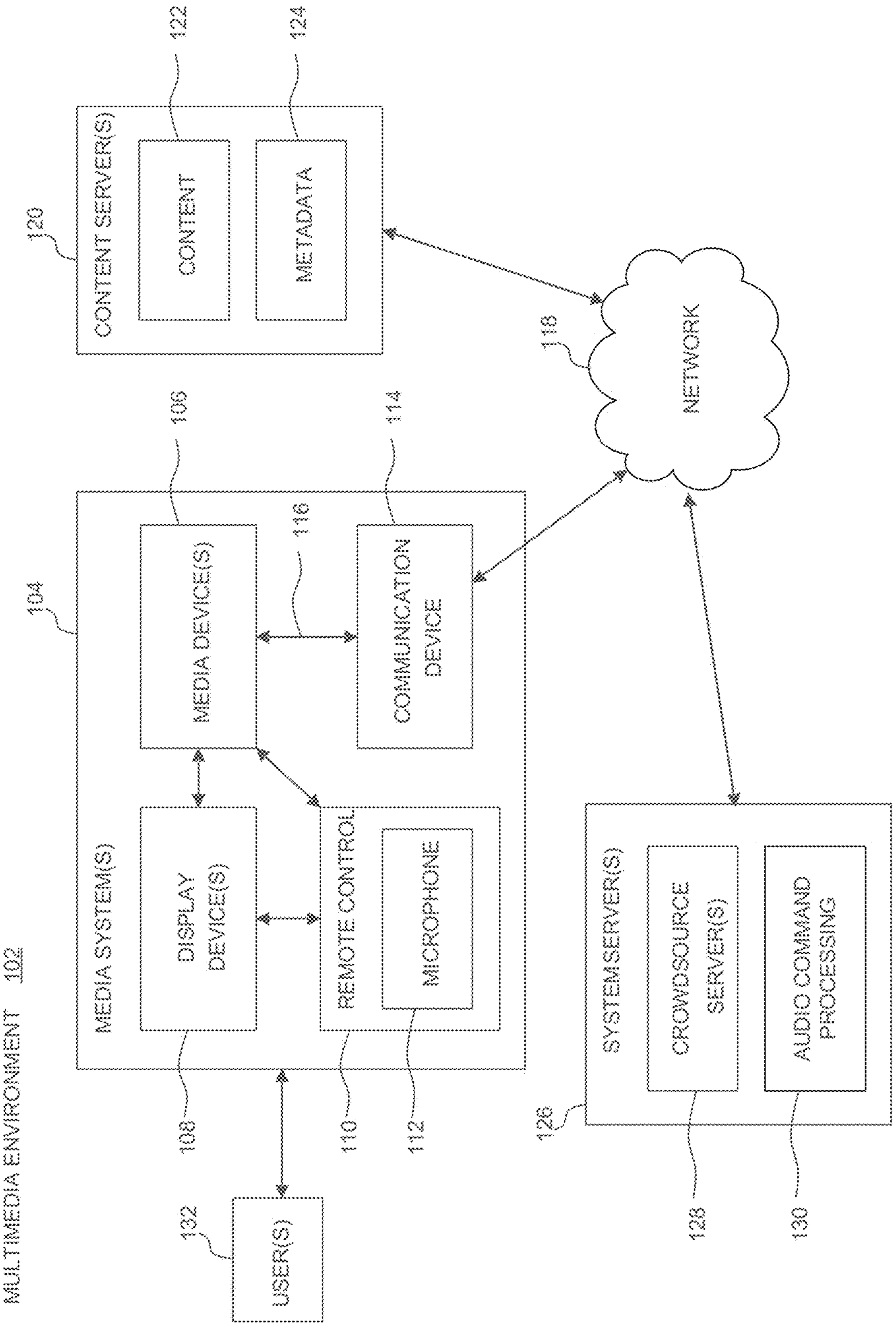
FIG. 1 illustrates a block diagram of a multimedia environment, according to some aspects.

Various aspects of this disclosure may be implemented using and/or may be part of a multimedia environment 102 shown in FIG. 1. It is noted, however, that multimedia environment 102 is provided solely for illustrative purposes, and is not limiting. Aspects of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some aspects. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User 132 may operate with the media system 104 to select and consume content.

Each media system 104 may include one or more media devices 106 each coupled to one or more display devices

108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, mobile device, voice assistant and/or digital video recording device, to name just a few examples. In some aspects, media device 106 can be a part of, integrated with, operatively coupled to, and/or connected to its respective display device 108 (e.g., connected to or integrated into a television). Display device 108 may be a monitor, television (TV), computer, smart phone, tablet, wearable (such as a watch or glasses), appliance, internet of things (IoT) device, and/or projector, to name just a few examples. For ease of description, various aspects may describe a media device 106 including a transmitter or transceiver. However, the display device 108, such as a television, may also include the transmitter or transceiver components and perform any of the aspects disclosed herein. Alternatively, communication devices 114 may include the transmitter or transceiver components and perform any of the aspects disclosed herein.

Each media device 106 may be configured to communicate with network 118 via a communication device 114. The media device 106 may communicate with the communication device 114 over a link 116, wherein the link 116 may include wireless, such as Wireless Fidelity (WiFi) and/or wired connections.

In various aspects, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110 (e.g., a television remote control). The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an aspect, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some aspects, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing aspects and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance user's viewing experience at particular portions of the movie (for example, when the soundtrack of the movie is difficult to hear), and turning closed captioning off may enhance user's viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command-processing module 130. As noted above, the remote control 110 may include a microphone 112. The microphone 112 may receive audio data from user 132 (as well as other sources, such as the display device 108). In some aspects, the media device 106 may be audio responsive, and the audio data may represent verbal commands from the user 132 to control the media device 106 as well as other components in the media system 104, such as the display device 108.

In some aspects, the audio data received by the microphone 112 in the remote control 110 is transferred to the media device 106, which is then forwarded to the audio command-processing module 130 in the system servers 126. The audio command-processing module 130 may operate to process and analyze the received audio data to recognize the user's verbal command. The audio command-processing module 130 may then forward the verbal command back to the media device 106 for processing.

Figure 2:
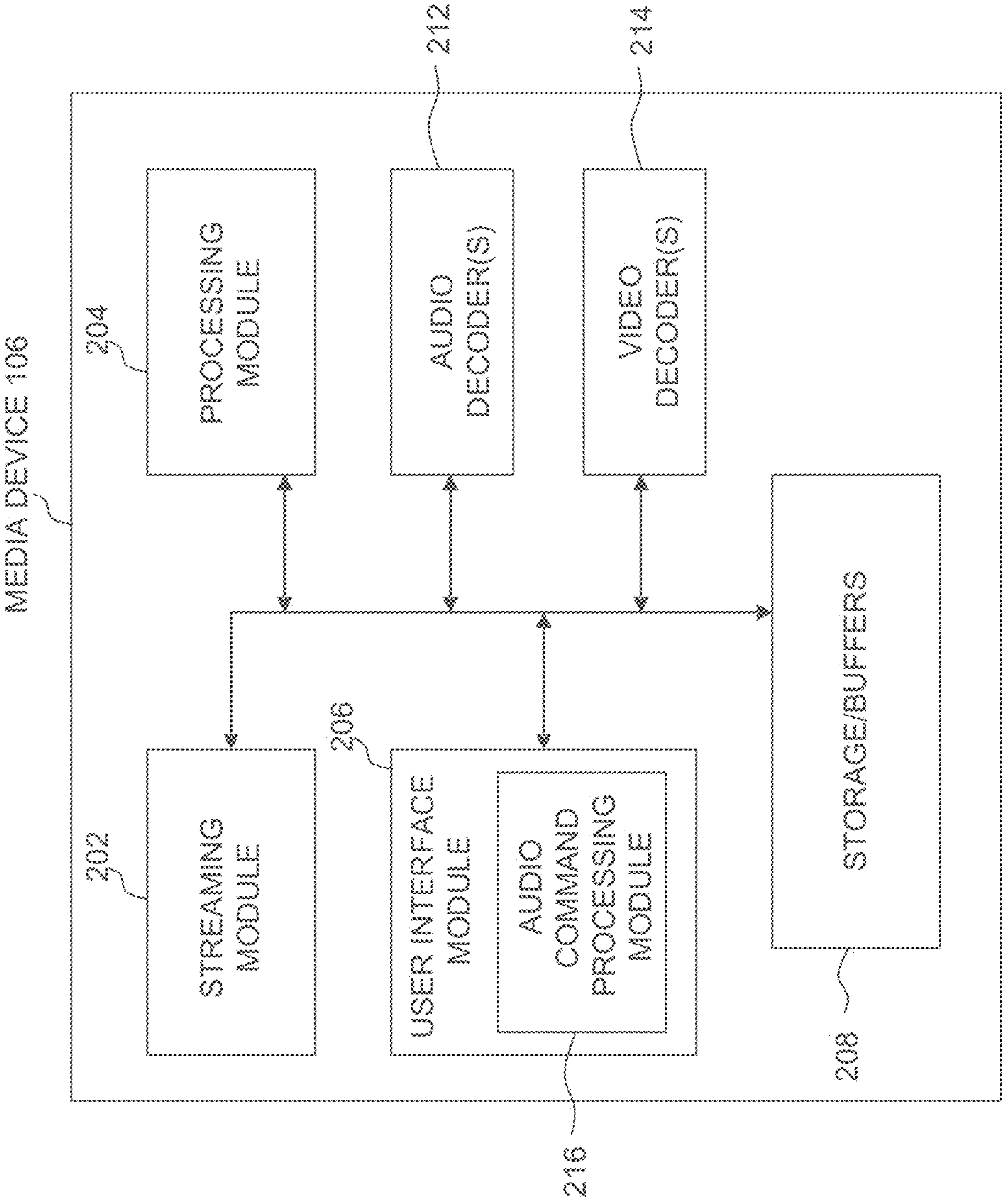
FIG. 2 illustrates a block diagram of a streaming media device, according to some aspects.

In some aspects, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command-processing module 130 in the system servers 126, or the verbal command recognized by the audio command-processing module 216 in the media device 106).

FIG. 2 illustrates a block diagram of an example media device 106, according to some aspects. Media device 106 may include a streaming module 202, processing module 204, storage/buffers 208, and user 132 interface module 206. As described above, the user 132 interface module 206 may include the audio command-processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2) OGG (ogg, oga, ogv, ogx), WMV (wmy, wma, asf), WEB1M, FLV, AVI, QuickTime, HDV, MXF (OPia, OP-Atom), MPEG-TS, MPEG-2PS, MPEG-2TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEC2. MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some aspects, the user 132 may interact with the media device 106 via, for example, the remote control 110. For example, the user 132 may use the remote control 110 to interact with the user 132 interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming aspects, the streaming module 202 may transmit the content to the display device 108 in real time or near real time as it receives such content from the content server(s) 120. In non-streaming aspects, the media device 106 may store the content received from content server(s) 120 in storage/buffers 208 for later playback on display device 108.

Remote Control Locator

Figure 3:
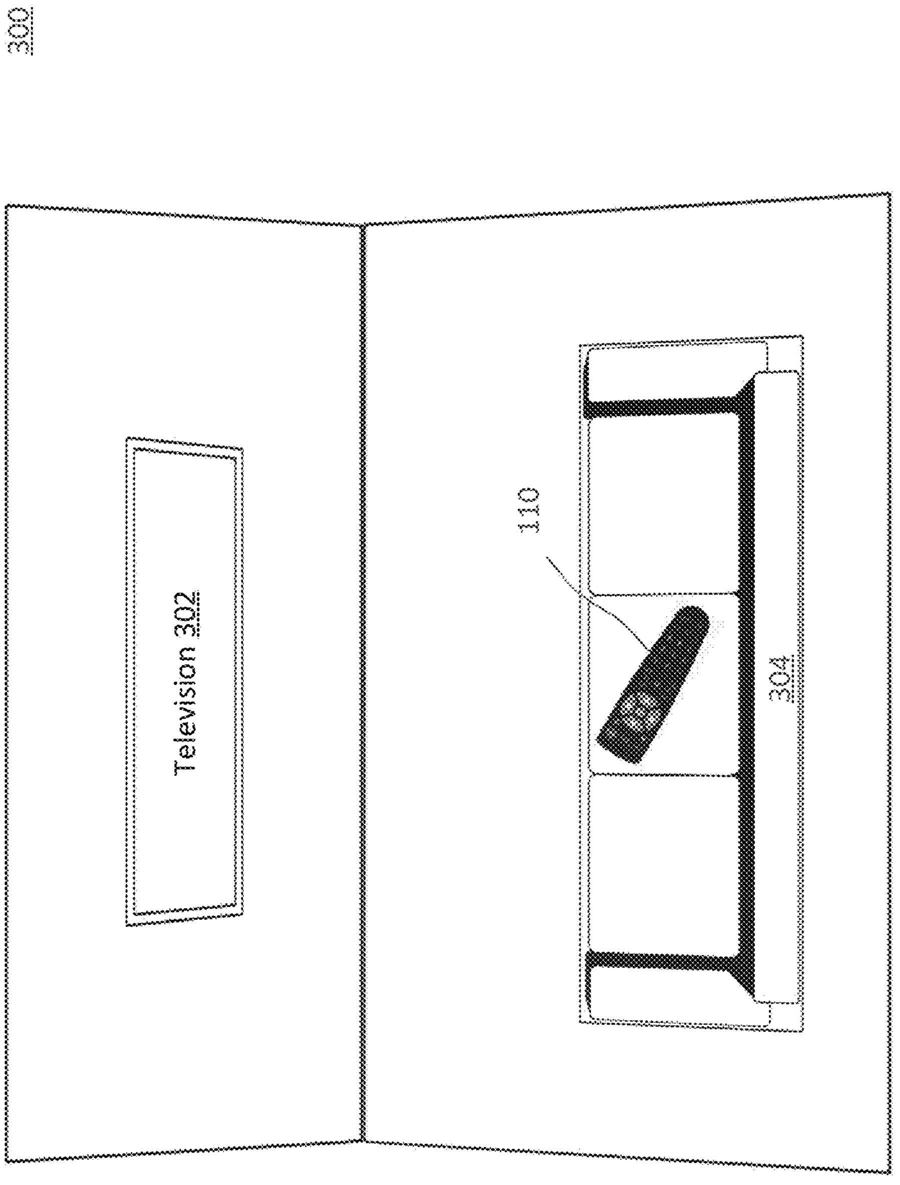
FIG. 3 illustrates an example home environment where a user may desire to watch television, according to some aspects.

FIG. 3 illustrates an example home environment 300 where a user 132 may desire to watch television. Television 302 may be operated by a remote control 110 through manual inputs or voice activated commands. However, remote controls get lost in all sorts of places: under a sofa 304, down the back of the sofa 304, inside magazines, wrapped tip in blankets, and so on. Various aspects are disclosed herein to assist a proximate user (e.g., same room) in finding the remote control 110.

In an example aspect, the technology disclosed herein operates by a transmitter within a media device 106 transmitting an encoded radio frequency to wake-up a proximate remote control 110 and initiate a "find my remote" process. For example, a passive circuit integrated within the remote control 110 receives the transmitted encoded radio frequency signal. Once awake, the remote control 110 may provide an indicator of location to a proximate user. The indicator of location may be an aural or visual indicator of the location of the remote control 110 to assist user 132 in locating it.

In another example aspect, the technology disclosed herein operates by a transceiver of a media device 106 transmitting high frequency radar signals to a radar transponder circuit within the remote control 110, so that it becomes visible to the radar. Once the transponder is activated, the radar may locate the remote control 110 relative to the display device 108 (e.g., television) and display the location of the remote control on-screen, on a mobile device screen, or other display device 108. In one aspect, a WiFi-enabled television remote may be activated by a radar beacon so that the television can locate it.

Figure 4:
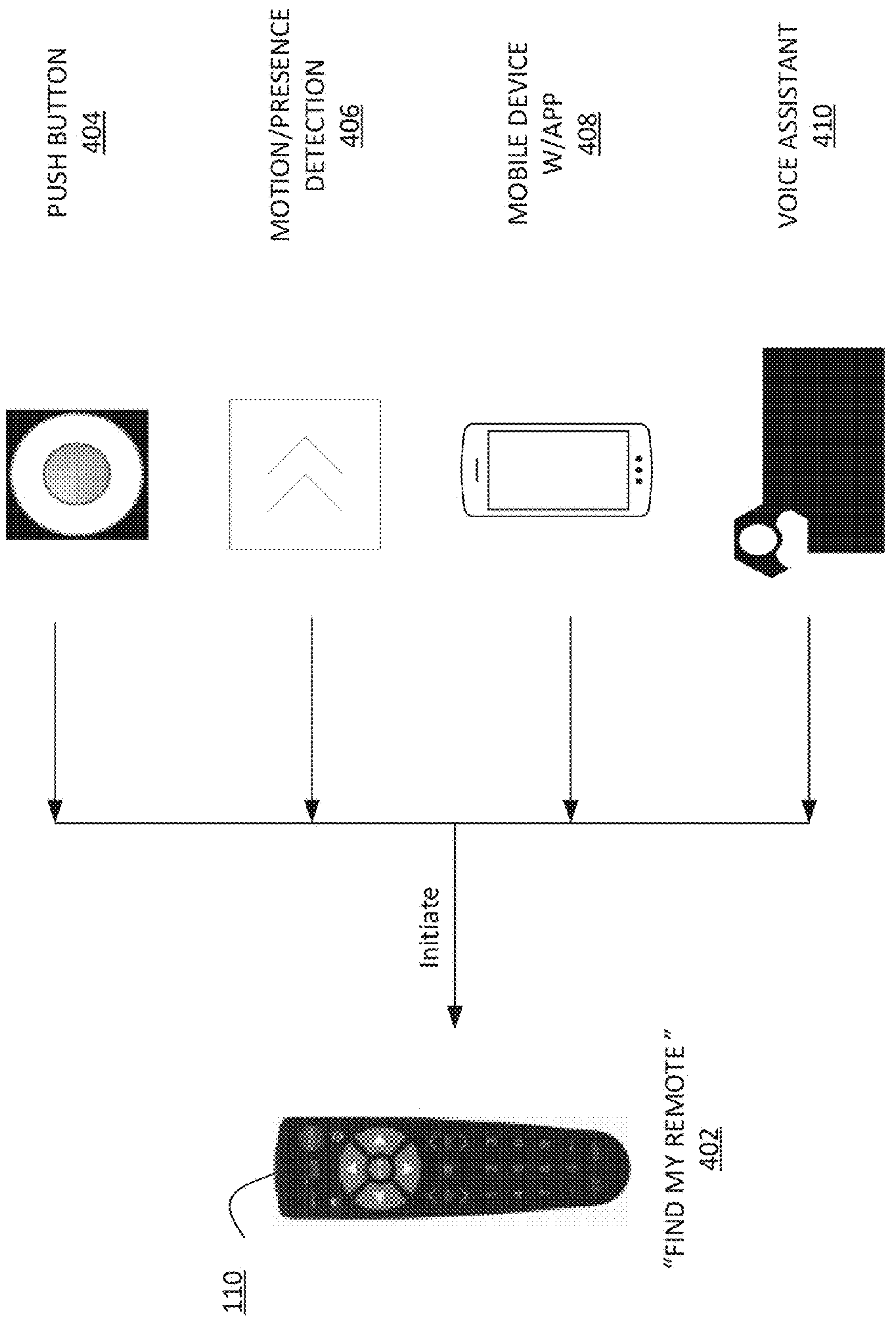
FIG. 4 illustrates a find my remote process initiation, according to some aspects.

FIG. 4 illustrates a "find my remote" request 402 initiation diagram, according to the various aspects disclosed herein. Throughout these descriptions, references to remote control 110, display device 108 (e.g, television), media device 106, as shown in FIGS. 1 and 3, are included to assist in an understanding of the processes described in FIG. 4. The aspects disclosed with reference to FIG. 4 may be applied to any of the "find my remote" processes or systems described by the various aspects disclosed herein. The described initiation processes may be performed by processing logic that can comprise hardware (e.g., circuitry, dedicated logic, programmable logic, microcode, etc.), software (e.g., instructions executing on a processing device), or a combination thereof. It is to be appreciated that not all processes or elements may be needed to perform the disclosure provided herein.

In one aspect, a user 132 enters room 300 and initiates a search for a remote control 110. For example, the user 132 may manually activate a push button 404 located within media system 104 components, such as display device 108. Display device 108 may be a monitor, television (TV), computer, smart phone, tablet, wearable (such as a watch or glasses), appliance, Internet of things (toT) device, and/or projector, to name just a few examples. Alternatively, or in addition to, the push button may be located within media device 106. Media device 106 may be a streaming media device, DVD or BLU-RAY device, audio/video playback device, cable box, television, audio assistant, and/or digital video recording device, to name just a few examples. In some aspects, media device 106 can be a part of, integrated with, operatively coupled to, and/or connected to its respective display device 108 (e.g., connected to or integrated into a television). Alternatively, or in addition to, the push button may also be located within communication device 114. The communication device 114 may include, for example, a cable modem or satellite TV transceiver. Alternatively, or in addition to, media device 106 or display device 108 software may trigger the remote control 110 search process.

In another aspect, a user 132 enters room 300 and a transceiver within media device 106 operates by periodically transmitting high frequency signals, for example, radar, acoustic, or infrared signals to detect the motion or presence 406 of user 132 in the vicinity of the transmitting device. Alternatively, Internet of Things (IoT) cameras may be used to detect a user's presence or capture specific gestures that would be recognized as "find my remote." Once a user's presence has been detected and some time has passed, or the user 132 indicates to the TV that they need help finding the remote (e.g., push button press), the "find my remote" process 402 is initiated. Additional descriptions of detecting user presence may be found in U.S. Pat. No. 10,455,322, entitled "Remote control with presence sensor" and incorporated by reference in its entirety.

In another aspect, the technology disclosed herein initiates a "find my remote" process by a media device 106, such as a mobile device implementing a mobile device application (App) 408. For example, a user 132 opens the "find my remote" app on their mobile device and selects a "find my remote control" graphic button through a User Interface (UI), such as a smartphone display, with touch or voice inputs.

In one aspect, the technology disclosed herein operates by implementing a media device 106, such as a voice assistant 410. A voice assistant may be a stand-alone communication device or be integrated within any media device, such as display device 108. A user 132 speaks the phrase "find my remote control" or similar phrasing to an on-premises voice assistant 410. In a backend voice platform system (e.g., on system server(s)126), the voice assistant converts the spoken phrase into a command signal to be communicated to any of the "find my remote control" processes or systems described by the various aspects disclosed herein.

While multiple "find my remote" initiation aspects have been described heretofore, the disclosure is not limited thereto. Any known or future method of initiating a "find my remote" command sequence may be substituted without departing from the scope of the technology described herein.

Find My Remote Control with an Encoded Communication Signal

Figure 5:
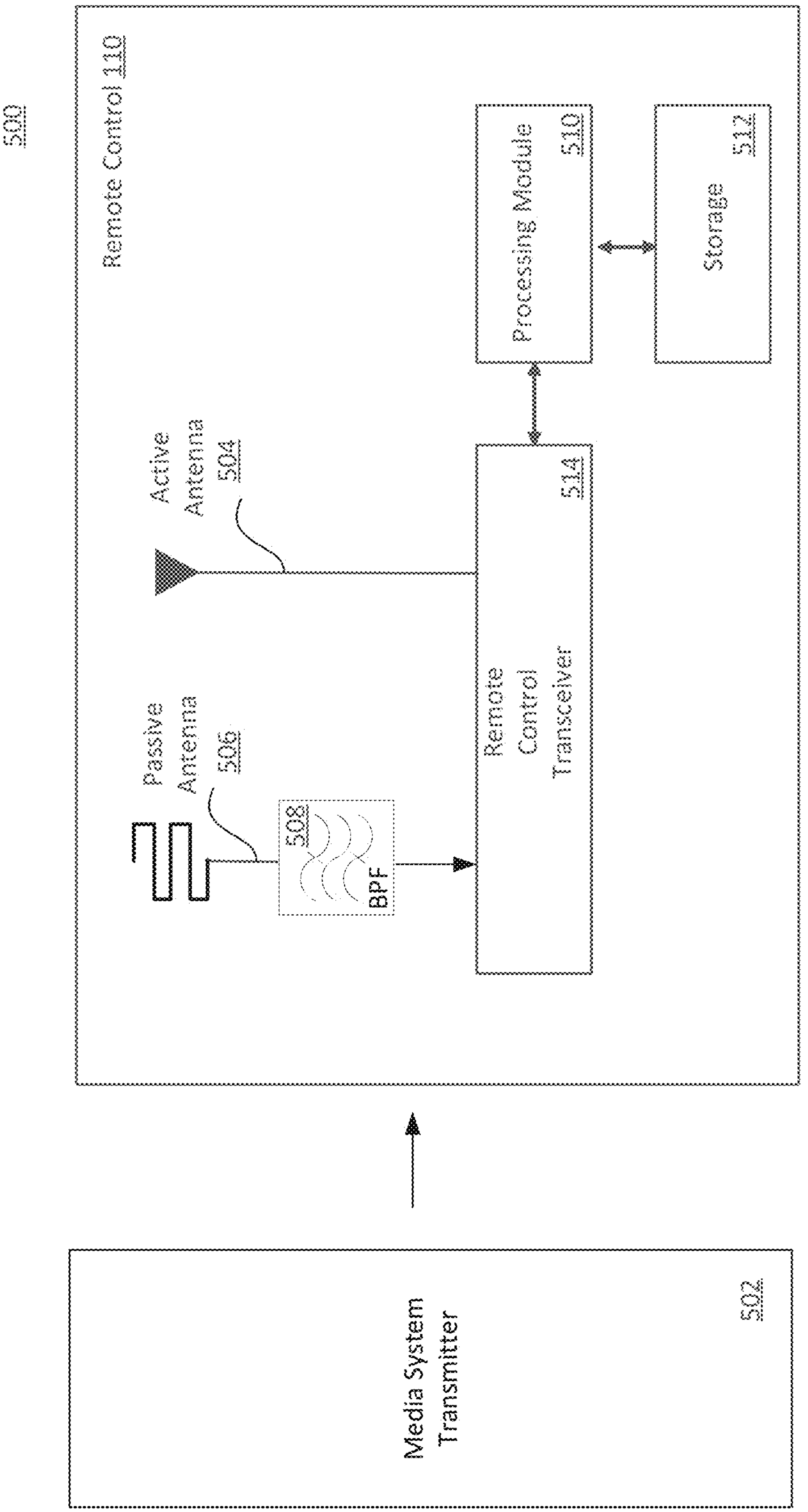
FIG. 5 illustrates an example system diagram for assisting a user to locate a remote control, according to some aspects.

FIG. 5 illustrates an example aspect system diagram 500 for assisting a user 132 to locate a remote control 110, according to some aspects.

A remote control 110 may implement a sleep cycle to reduce battery drain. For example, the remote control 110 may wake up from a sleep cycle upon receiving a signal, such as an input (e.g., button pushed, voice activation, movement, or periodically as scheduled). In various aspects, the remote control 410 may be required to wake up periodically to poll for a transmitted "find my remote" signal. For example, the remote control 110 wakes up from a current sleep cycle to check if a transmitter from media device 106 or display device 108 has transmitted an interrupt signal which would trigger processing the signal to see if the received signal is the "find my remote" command or message. Alternatively, or in addition to, the remote control 110 may wake up from a current sleep cycle to scan for a full signal (e.g., an encoded communication signal with "find my remote control" message), without relying on any interrupt.

Figure 6A:
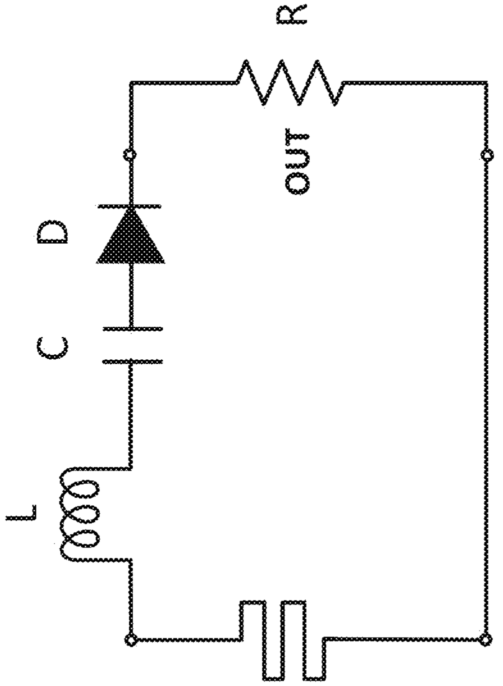
FIGS. 6A and 6B illustrate example RLC circuits configured as band-pass filters, according to some aspects.
Figure 6B:
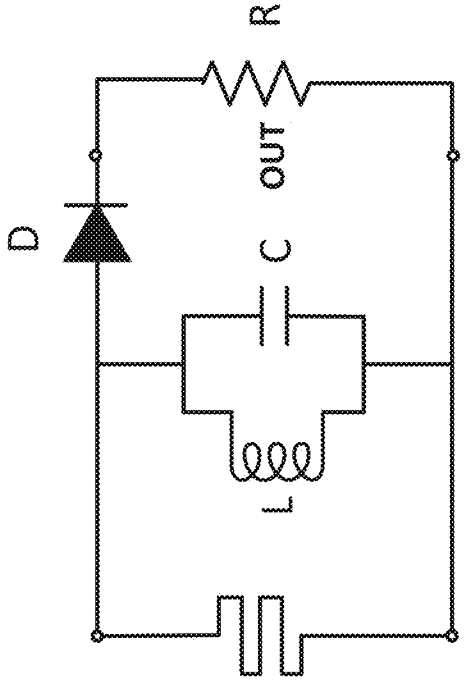

In this example aspect, passive components (e.g., resistors, capacitors, and inductors) are configured to form an RLC circuit (e.g., see FIGS. 6A and 6B). The RLC circuit tunes (i.e., filters) a passive antenna 506 to capture an encoded communication signal modulated on a selected carrier frequency (i.e., modulated radio frequency signal). The captured encoded communication signal is operative to wake up a television remote currently in a sleep state and provide a "find my remote" command message. The encoded communication signal may be a single signal or be arranged as multiple signals. In a first aspect, the encoded signal may include a first communication signal that is transmitted from media device 106 or display device 108 instructing the remote to wake up, followed by a second encoded communication signal instructing the remote control to initiate "find my remote control" indicators, such as aural (e.g., beeping or verbal instructions) or visual (e.g., a flashing light). In a second aspect, the encoded communication signal includes both a wake up instruction as well as a command message (e.g., "wake up" and "find my remote control"). In one example, the encoded communication signal implements a binary ASCII message, such as "find my remote control". However, any patterned message, statistically unlikely to occur randomly, may be substituted without departing from the scope herein.

In one aspect, the remote control 110 includes an RLC (resistor R, inductor L, and capacitor C) oscillator, aka "radio", with a passive antenna 506, such as, but not limited to, a Printed Circuit Board (PCB) trace antenna. The channel or frequency that this radio would listen to may be based on the value of those components (i.e., RLC). The RLC oscillator may tune the passive antenna 506 to receive a known frequency range or passband within the radio frequency spectrum and may be commonly known as a passband filter or band pass filter (BPF) 508. The RLC oscillator may reject signals outside of this passband. The radio spectrum is a part of the electromagnetic spectrum with frequencies from 3 Hz to 3,000 GHz. An encoded communication signal transmitted from media system transmitter 502 (e.g., a media device 106 transmitter) would be filtered within this selectable passband, as it is received by the passive antenna 506, and subsequently communicated to a remote control transceiver 514. The encoded communication signal may be provided from the remote control transceiver 514 as an input to a processing module 510, such as a microcontroller unit (MCU) or System on Chip (SoC), to read the signal and identify it as a particular state (e.g., OFF (sleep) or ON (awake). This state may be ON for implementing "Find my remote" processes. The "Find my remote" processing instructions and historical state changes may be collected in storage 512 (e.g., RAM memory).

When the BPF 508 receives the communication signal, it wakes up (e.g., powers on) the remote control 110 and initiates a "find my remote" process to provide a proximate user 132 an indicator of its location. For example, the indicator may be a sound or light (or both) to attract the user 132 to the remote's location. For example, processing module 510 implements a "find my remote" instruction set stored in memory 512. This instruction set may generate one or more of an aural signal (e.g., attention grabbing sound) to be amplified and instantiated (e.g., transmitted by a speaker) by an on-board circuit (not shown) on the remote control 110 or a visual signal (e.g., bright light) to be amplified and instantiated (e.g., flashing Light Emitting Diode (LED)) by an on-board circuit (not shown) on the remote control 110. These indicators may be varied in repetition frequency, intensity and/or amplitude (e.g., cadence changes, higher volume, or brighter flashes of light, etc.) to guide a user 132 to the location of the remote control.

This aspect may be implemented as a stand-alone system within the remote control 110 or advantageously integrated as shown into the existing remote control transceiver 502 that processes common remote control functions through communication signals received/transmitted by active antenna 504.

One technical improvement of this aspect is the addition of a low power, low bandwidth communication channel from a host (e.g., media device 106) to the remote control 110. Another technical improvement of this aspect is an ability to trigger passive circuits that receive a "find my remote" communication signal without first using local power (e.g., batteries), thus reducing battery drain.

FIGS. 6A and 6B illustrate example RLC circuits configured as band-pass filters 508, according to some aspects. An RLC circuit is an electrical circuit consisting of a resistor (R), an inductor (L), and a capacitor (C), connected in series or in parallel. The name of the circuit is derived from the letters that are used to denote the constituent components of this circuit, where the sequence of the components may vary. The circuit forms a harmonic oscillator for current, and resonates in a manner similar to an LC circuit. Introducing the resistor R increases the decay of these oscillations, which is also known as damping. The resistor also reduces the peak resonant frequency. As described herein, radio receivers (e.g., remote control transceiver 514) use them for tuning to a select narrow frequency range from ambient radio waves. In this role, the circuit is often referred to as a tuned circuit. The tuning application of the instant technology is an example of band-pass filtering.

The resonance effect can be used for filtering; the rapid change in impedance near resonance can be used to pass signals close to the resonance frequency. A key parameter in filter design is bandwidth. The bandwidth is measured between the cutoff frequencies, most frequently defined as the frequencies at which the power passed through the circuit has fallen to half the value passed at resonance. There are two of these half-power frequencies, one above, and one below the resonance frequency.

In the filtering application, the resistor R becomes the load that the filter is working into. The value of the damping factor is chosen based on the desired bandwidth of the filter. For a wider bandwidth, a larger value of the damping factor is required (and vice versa). The three components give the designer three degrees of freedom. Two of these are required to set the bandwidth and resonant frequency.

A band-pass filter (e.g., BPF 508) can be formed with an RLC circuit by either placing a series LC circuit in series with the load resistor as shown in FIG. 6A or by placing a parallel LC circuit in parallel with the load resistor R, as shown in FIG. 6B. Other band-pass configurations are considered within the scope of the technology disclosed herein. In addition, while shown with a passive antenna 506 to reduce power requirements, an active antenna, for example active antenna 504 as shown in FIG. 5, may be substituted without departing from the scope of the technology disclosed herein.

In this aspect, the RLC circuit forms a simple radio that may be wired into an analog-to-digital convertor (ADC) pin (not shown) with the PCB trace antenna (e.g., passive antenna 506) integrated into the existing remote control circuit board. The RLC circuit output signal would be amplified (e.g., by a low noise amplifier (LNA)) and subsequently passed through an envelope detector (not shown). The envelope detector may be used to demodulate the previously received modulated signal by removing all high frequency components of the signal. In some aspect embodiments, the circuit is configured with a diode D in series with the load. A sampling frequency of the diode D may not be as fast as the carrier frequency, therefore the carrier sine wave is first rectified to obtain the modulated signal. As shown, the circuit may be configured as a low-pass filter to filter out the carrier frequency and the remaining signal fed to the ADC pin.

Figure 7:
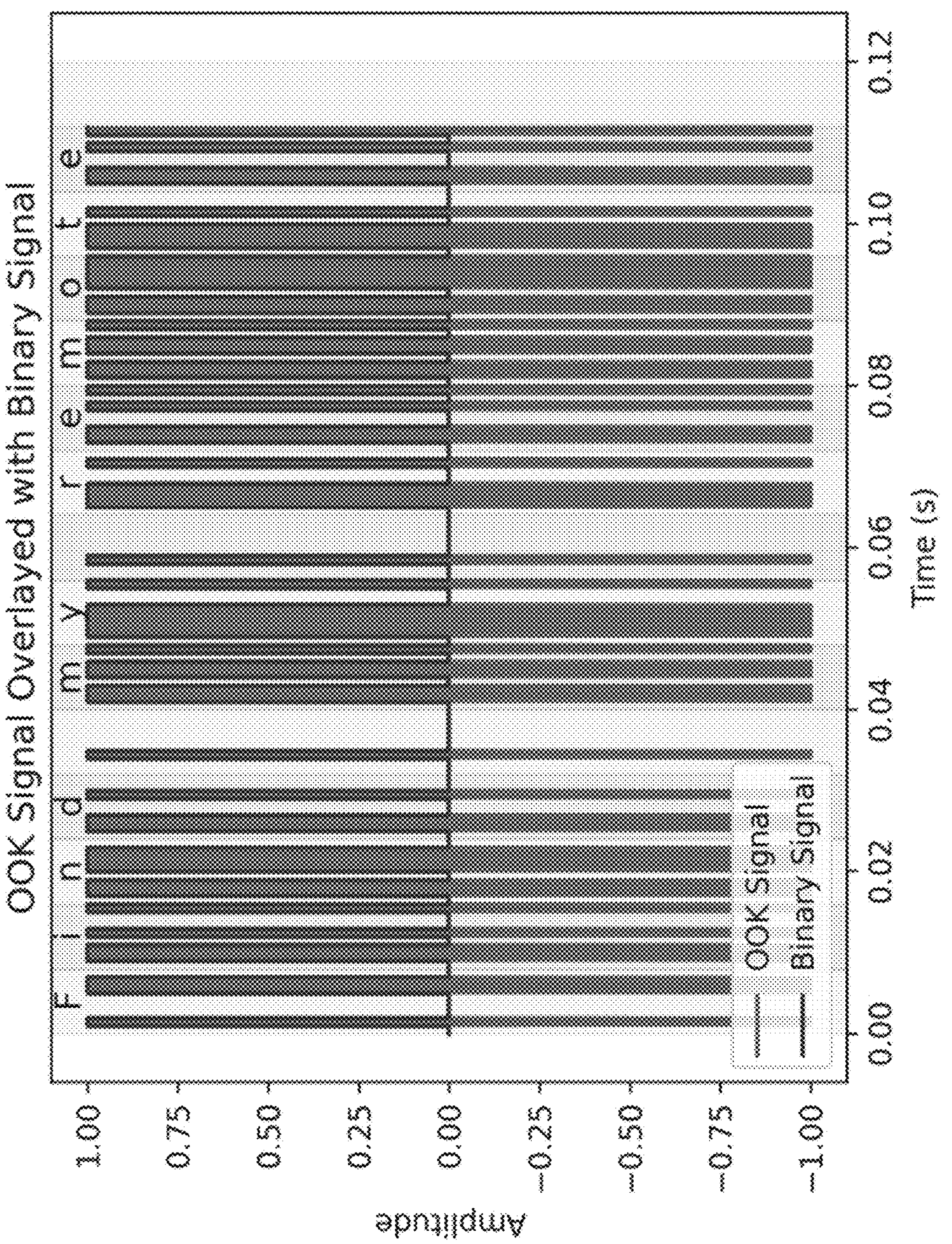
FIG. 7 illustrates an example encoded communication signal, according to some aspects.

FIG. 7 illustrates an example encoded communication signal, according to some aspects. An encoded communication signal may be generated by defining a message string (e.g., binary) reflecting a message to be sent to the remote control 110. While illustrated as "Find My Remote" in ASCII, it could be any variation that the remote could decode using a low-power or passive circuit. For example, the message could be "wake", "wakeup", "FMR" (Find My Remote), "find", etc. without departing from the scope of the technology described herein. Alternatively, or in addition to, the encoded communication signal may be encrypted for secure communications.

The message string, in various aspects, may subsequently be modulated by media system transmitter 502 to generate the communication signal. The modulation scheme may be any modulation scheme including, but not limited to, analog modulation, digital modulation, pulse modulation, and spread spectrum methods. Examples of these include, but are not limited to, OOK, FSK (Frequency-Shift Keying), BPSK (Binary Phase Shift Keying), amplitude-shift keying (ASK), WiFi, etc. In various aspects, the modulation scheme is simple, requiring lower power than traditional modulation schemes. Complex modulation schemes with high data rates, complex encoding or security schemes are not preferred in the passive circuit aspects disclosed herein, but are not considered outside of the scope of the technology disclosed herein. However, modulation schemes that transmit multiple bits simultaneously or use varying/multiple frequencies would not be necessary to implement the aspects disclosed herein (e.g., Quadrature Amplitude Modulation (QAM) or Orthogonal Frequency-Division Multiplexing (OFDM).

In one example aspect. On-Off Keying (OOK) may be used to communicate from the host (e.g., media device 106) to the remote control 110. FIG. 7 illustrates a 2.4 GHz carrier wave being modulated on and off to send the message "Find My Remote" in ASCII. In this example, a transmitter (e.g., media system transmitter 502) would modulate the message string using OOK modulation based on a selectable OOK sequence, carrier frequency, data rate, and sampling rate.

When the passive RLC circuit (e.g., BPF 508) receives the encoded communication signal, it wakes up by powering on the remote and initiates a find process to provide a proximate user 132 an indicator of location. For example, the indicator may be a sound or light (or both) to attract the user 132 to the remote's location.

The passive antenna 506 receives the OOK communication signal and is tuned to receive the OOK communication signal within a frequency band (i.e., passband). The RLC circuit rejects signals outside of this passband. The RLC circuit communicates the received OOK signal to the remote control's built-in transceiver 514 to be demodulated based on the previously defined OOK sequence, carrier frequency, data rate, and sampling rate using known demodulation techniques. The demodulated OOK communication signal is subsequently decoded to detect the original transmitted message string, for example "Find my remote".

In one aspect, the transmission of the OOK communication signal is repeated to provide multiple opportunities for a successful reception at the remote control 110. The processing module 510 may perform the demodulation and decoding functions. Upon a successful decoding of the message string, the processing module 510 may ignore additionally received OOK communication signals until some time period has passed. For example, the processing module may initiate the sound or light attention sequence and ignore any repeated OOK communication signals until another "find my remote" request initiates a new cycle.

Figure 8:
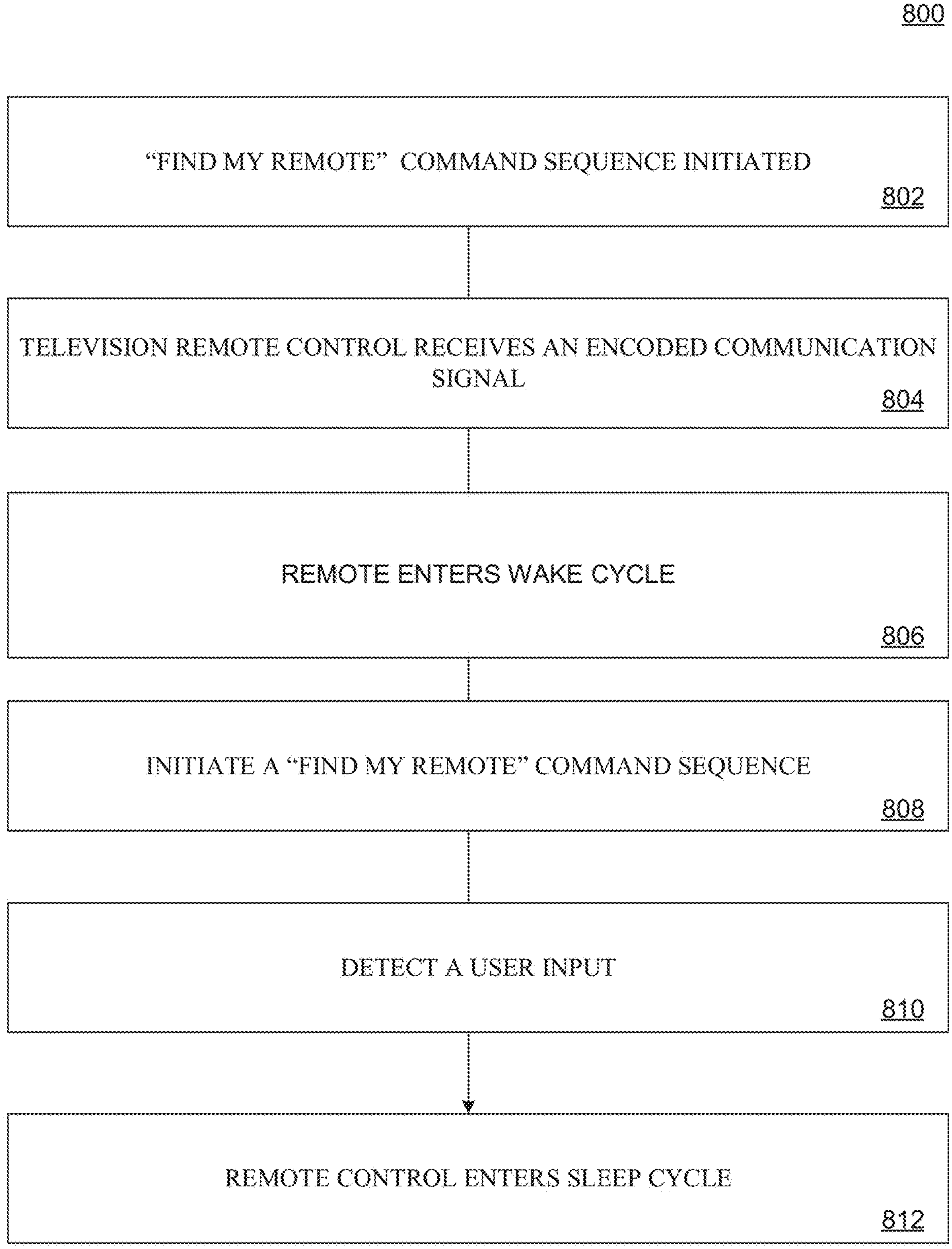
FIG. 8 is a flowchart for a method for locating a remote control by encoded communication signals, according to some aspects.

FIG. 8 is a flowchart for a method 800 for assisting a user 132 to find a remote control 110 by encoded communication signals, according to an aspect. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 1 and FIG. 5. However, method 800 is not limited to these example aspects.

In step 802, media system transmitter 502, such as a transmitter within a media device 106, generates a "find my remote control" initiating command sequence on behalf of a user 132 searching for a remote control 110. Any of the processes, variations or equivalents, described in association with FIG. 4 may be implemented as an initiating trigger. For example, a user 132 presses a button 404 or selects a "find my remote" command on their mobile phone with app 408 through an UI, such as an Application Programming Interface (API).

In step 804, remote control 110 receives an encoded communication signal from the media system transmitter 502. The encoded communication signal may be a single signal or be arranged as multiple signals. In a first aspect, the encoded signal may include a first communication signal that is transmitted from a media device 106 instructing the remote to wake up, followed by a second encoded communication signal instructing the remote control 110 to initiate "find my remote control" indicators, such as aural (e.g., beeping) and/or visual (e.g., a flashing light). In a second aspect, the encoded communication signal includes both a wake up instruction as well as a command message (e.g., "wake up" and "find my remote control"). In one example, the encoded communication signal implements a binary ASCII message, such as "find my remote control". However, any patterned message, statistically unlikely to occur randomly, may be substituted without departing from the scope herein.

In step 806, remote control 110 processes the encoded communication signal to wake up. For example, processing module 510 processes the encoded communication signal to "power on" the remote control 110. In one aspect, the remote control 110 may wake up periodically to poll for the "find my remote control" signal. In another aspect, the remote control 110, upon waking up from a current sleep cycle, may check to see if a radio circuit has generated an interrupt, which would trigger processing the encoded communication signal to see if it is the "find my remote" signal. Alternatively, or in addition to, the remote control 110 wakes up completely from a current sleep cycle to scan for a full signal (i.e., an encoded communication signal with "find my remote control" message), without relying on any interrupt.

In step 808, remote control 110 processes the encoded communication signal to initiate a "find my remote" command sequence. For example, processing module 510 demodulates and decodes the received encoded communication signal and subsequently implements a "find my remote" instruction set stored in memory 512. This instruction set may generate any of an aural signal (e.g., loud sound) to be amplified and instantiated (e.g., transmitted by a speaker) by an on-board circuit (not shown) on the remote control 110 or a visual signal (e.g., bright light) to be amplified and instantiated (e.g., flashing LED) by an on-board circuit (not shown) on the remote control 110. These indicators may be varied in repetition frequency and/or amplitude (e.g., cadence changes, higher volume, or brighter flashes of light, etc.).

In step 810, remote control 110 may repeat the "find my remote" instruction set until detecting a user 132 input, such as movement of the remote control 110, a button press or voice activation. For example, the instruction set to generate an attention grabbing sound may be repeated. After a short period of time (e.g., 10 seconds) without detecting a user 132 input, the remote control 110 may discontinue the "find my remote" process until receiving another initiating cycle.

In step 812, remote control 110 initiates a sleep cycle. In a first example aspect, in response to not detecting inputs from user 132 for some selectable period of time, the remote control 110 initiates the sleep cycle. In a second example aspect, in response to detecting no "additional" inputs from user 132 for some selectable period of time, the remote control 110 initiates the sleep cycle.

Find My Remote Control with Radar

Figure 9:
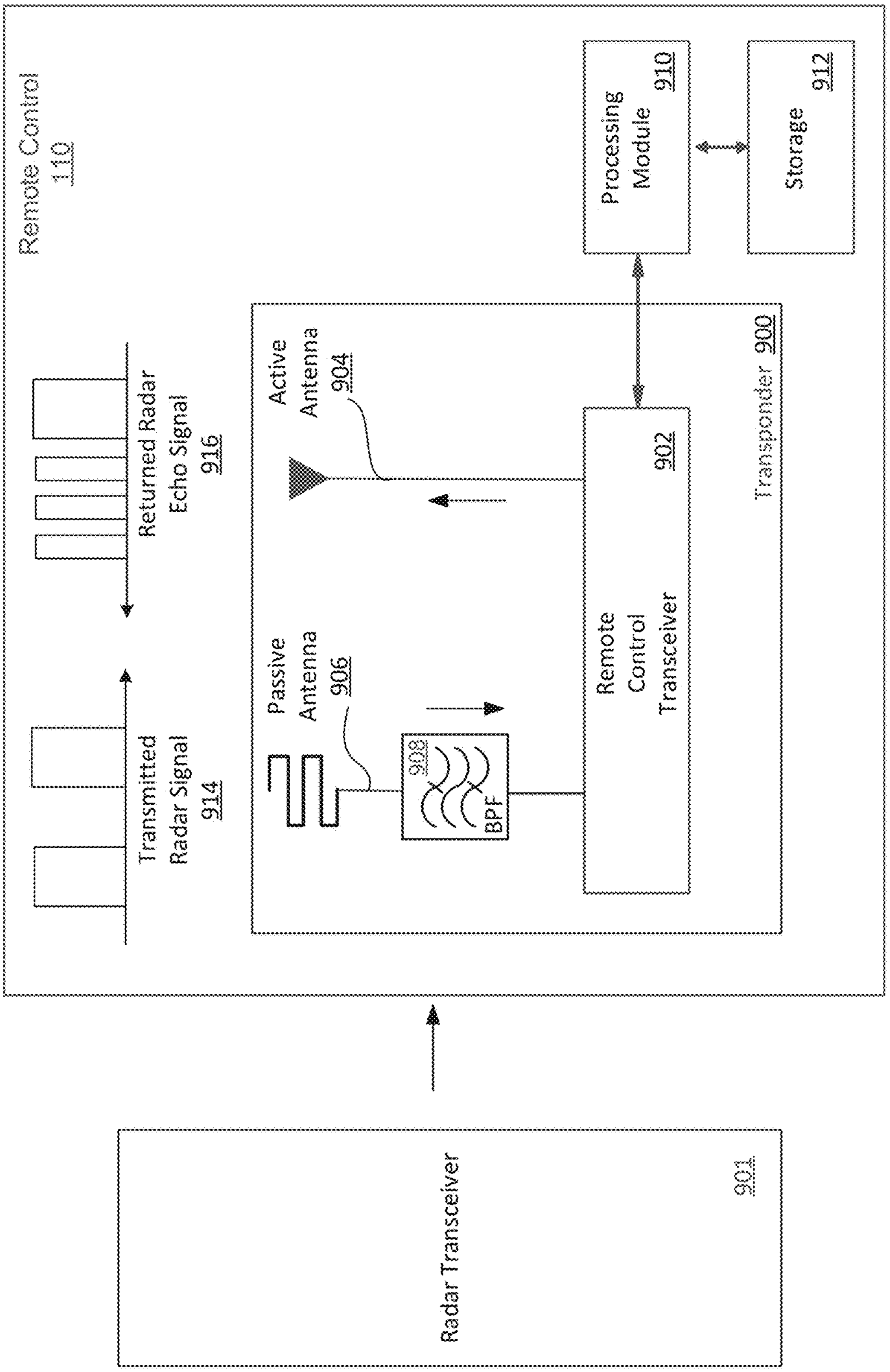
FIG. 9 illustrates a remote control with a radar transponder, according to some aspects.

FIG. 9 illustrates a remote control 110 with a radar transponder 900, according to some aspects. In one example aspect, a radar transceiver 901 (e.g., a radar transmitter/receiver within a media device 106) operates by transmitting a high frequency radar signal to detect the presence of a proximate remote control 110 (e.g., in a same room or nearby room). However, remote controls 110 are typically too small to be seen by the radar itself, so they would not normally be detectable. In this aspect, a radar transponder 900 located within the remote control 110, is activated by the transmitted radar signal 914 and configured to transmit back encoded information to the radar source (e.g., radar transceiver 901) through a returned radar echo signal 916. As such, the radar transponder makes the remote visible to the radar. This allows the radar transceiver to locate the remote control 110 and provide an indication to a user 132 of the location of the remote control 110 relative to the television or the room that the remote control 110 is located (described in greater detail hereafter).

Radar is a radiolocation system that uses radio waves to determine the distance (ranging), angle (azimuth), and radial velocity of objects relative to the site. A radar system consists of a transmitter producing electromagnetic waves in the radio or microwave domain, a transmitting antenna, a receiving antenna (often the same antenna is used for transmitting and receiving) and a receiver and processor to determine properties of the objects. Radio waves (pulsed or continuous) from the transmitter reflect off the objects and return to the receiver, giving information about the objects' location.

A remote control 110 may implement a sleep cycle to reduce battery drain. For example, the remote control 110 may wake up from a sleep cycle upon receiving a signal, an input (e.g., button pushed, voice activation, movement detection, or periodically as scheduled). In some aspects, the television remote would have to wake up periodically to poll for the transmitted radar signal 914.

In this example aspect, passive components (resistors R, capacitors C, and inductors L) may be configured (tuned) as a BPF 908 to pass a radar frequency received by a passive antenna 906 (e.g., PCB trace antenna). An existing transceiver circuitry (e.g., remote control transceiver 902) is configured with the BPF 908 and passive antenna 906 to form a RLC Radar transponder (radar transponder 900). In one aspect, the transmitted radar signal 914, received by the passive antenna 906 (e.g., PCB trace antenna), may provide power to the radar transponder 900 to place it in a wake cycle (i.e., powered-on). Alternatively, or in addition to, power may be sourced from batteries located within the remote control 110.

As illustrated in FIG. 9, the radar transponder 900 is illustrated sharing common remote control 110 components, such as an existing remote control transceiver 902 and active antenna 904. However, the radar transponder 900 may be implemented as a stand-alone component integrated into the remote control 110. In addition, while shown with inward signaling passive components (e.g., passive antenna 906 and BPF 908), one or more of these components may be substituted by active components without departing from the scope of the technology disclosed herein.

The radar transponder 900 may be activated to wake up from a current sleep state. The activated radar transponder 900 processes the incoming transmitted radar signal 914 to produce a returned radar echo signal 916 with encoded information. For example, storage 912 stores the incoming transmitted radar signal 914 and the processing module 910 encodes information within the stored radar signal as a radar echo signal. The radar echo signal signal may be transmitted through active antenna 904. In one aspect, the returned radar echo signal 916 includes encoded information based on a modulation technique. The encoded information may include, but not be limited to, a remote control identifier (ID), a television-remote pairing code, Infrared (IR) control codes for volume and power control, metadata located within a header or payload (e.g., in a digitally modulated signal), etc. Possible delays in remote response times, due to processing, may appear as an increase in distance. In some embodiments, the returned echo signal 916 response times may be corrected through calibration with an expected processing time (e.g., a known constant) in order to give a more accurate distance reading.

The source radar transceiver 901, located within media device 106, will receive the returned radar echo signal 916 and will identify the remote control 110 and make a calculation of the direction, distance and angle of the returned radar echo signal 916 and calculate, based on these parameters, a location of the remote control 110 relative to the source radar transceiver 901 or television.

In one aspect, the position of the located remote control 110 may be displayed directly on a screen of the display device 108 (e.g., television). In one aspect, the room is represented by a simple square, rectangle or cube graphic and the relative location of the television and remote is presented within the graphic (e.g., in 2D or 3D). In another aspect, one or more components of the media system 104 may first generate a mapping of the room and its objects (e.g., furniture) using radar or other object detection mechanisms, such as known acoustic or image based object detection systems or Internet of Things (IoT) transceivers or sensors. Once mapped, the location of the remote control 110 may be displayed on a graphical image of the mapped room and objects, again in 2D or 3D. Alternatively, or in addition to, the location may be displayed on a mobile device display using any of the above-described graphical methods. Alternatively, a lidar system may be implemented to map the room. Lidar, which stands for Light Detection and Ranging, is a remote sensing method that uses light in the form of a pulsed laser to measure ranges (variable distances).

One technical improvement of this aspect is an ability to trigger passive circuits that make a remote control 110 visible to radar. Another technical improvement of this aspect is the addition of a low power, low bandwidth communication channel from a host (e.g., media device 106) to the remote control 110. Another technical improvement of this aspect is an ability to trigger passive circuits that make a remote control 110 visible to radar, without first using local power (e.g., batteries), thus reducing battery drain.

In an alternative WiFi-enabled television aspect, the technology disclosed herein operates by the media device 106 communicating to the remote control 110 to activate an integrated radar beacon (e.g., a repeated communication signal) so that a TV radar transceiver may locate it. This method is appropriate for systems using WiFi-enabled television remotes.

In another alternative aspect, the remote control 110 may include an active beacon that could be periodically activated and subsequently detected by the radar transceiver 901. An active beacon may source power from onboard batteries.

Figure 10:
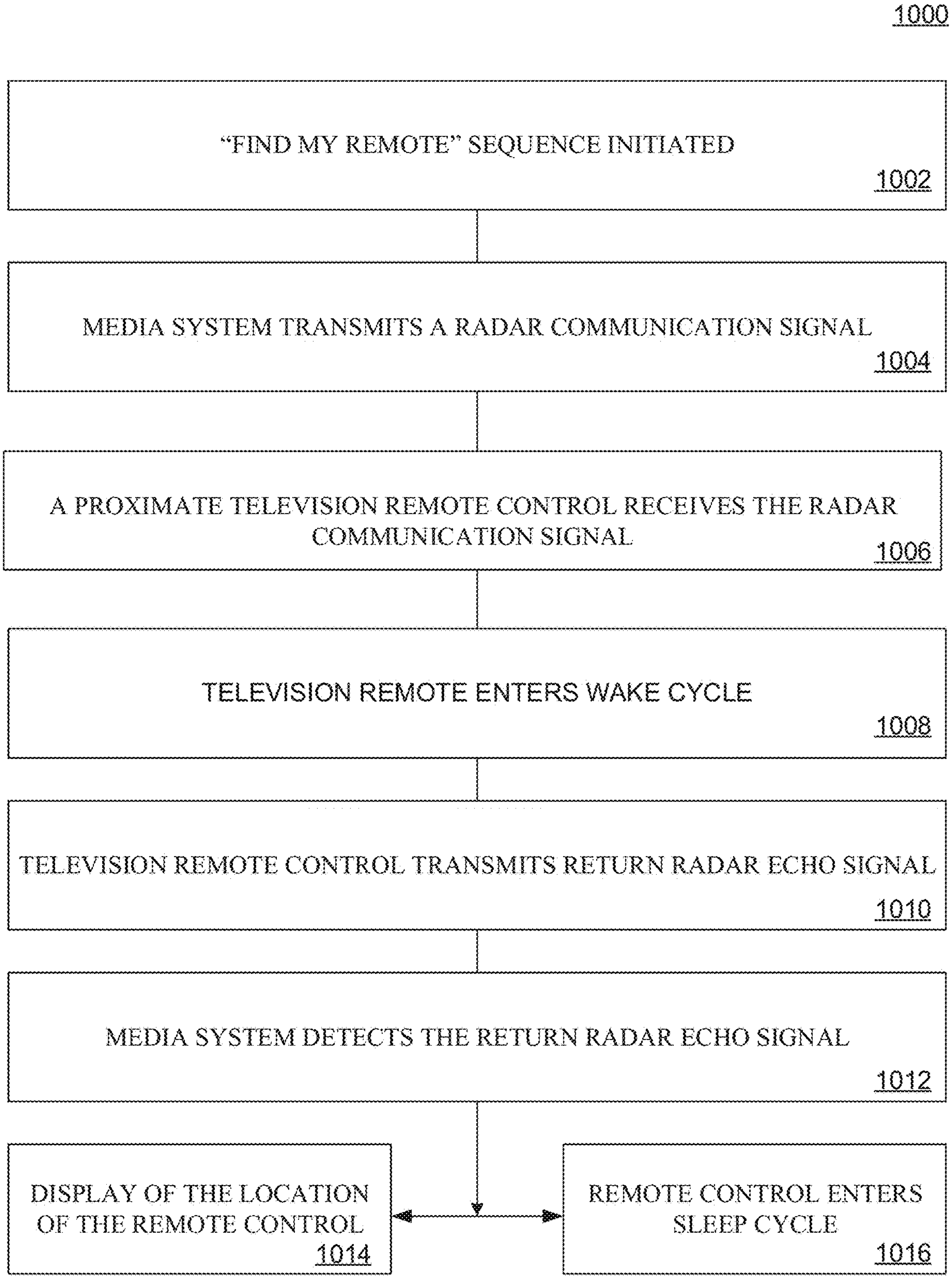
FIG. 10 is a flowchart for a method for locating a remote control with radar signals, according to some aspects.

FIG. 10 is a flowchart for a method 1000 for locating a remote control 110 with radar, according to an aspect. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIGS. 1, 4, 9, and 10. However, method 1000 is not limited to these example aspects.

In step 1002, media device 106 or display device 108 receives a request initiating a command sequence on behalf of a user 132 searching for a remote control 110. Any of the processes, variations or equivalents, described in association with FIG. 4 may be implemented as an initiating trigger. For example, a user 132 selects this command to "find my remote" on their mobile phone with an app 408 through an UI, such as an Application Programming Interface (API).

In step 1004, radar transceiver 901 (e.g., located within a media device 106) generates and transmits a radar signal in response to receiving the initiating a command sequence on behalf of a user 132 searching for a remote control 110. For example, a radar transceiver 901 transmits a radar communication signal.

In step 1006, remote control 110 receives the transmitted radar signal 914 from radar transceiver 901. The transmitted radar signal 914 may be a single signal or be arranged as multiple signals (e.g., repeating signal).

In step 1008, received transmitted radar signal 914 activates a sleeping radar transponder 900 that subsequently enters a wake cycle. For example, energy from the transmitted radar signal 914 is converted by a passive antenna 906 into energy to activate or power on the radar transponder for some period of time, for example, long enough to generate and transmit a return radar echo signal 916.

In step 1010, remote control 110 transmits an encoded version of the received transmitted radar signal 914 as a return radar echo signal 916. For example, processing module 910 implements a transponder instruction set stored in memory 912. This instruction set may encode the received transmitted radar signal 914 with remote control identification information and transmit the encoded radar signal as a returned radar echo signal 916 or it may store it as a sample to be returned as a repeated signal or returned in future wake cycles.

In step 1012, radar transceiver 901 monitors various returned radar echo signals to detect the returned radar echo signal 916 from remote control 110 and determine it location. For example, radar transceiver 901, located within media device 106, will receive the returned radar echo signal 916 and will identify the remote control 110 and make a calculation of the direction, distance and angle of the returned radar echo signal 916 and calculate, based on these parameters, a location of the remote control 110 relative to the source radar transceiver 901 or television.

In one aspect, the remote control radar echo signal 916 is recognized by a specific carrier frequency or by encoded information based on a modulation technique. The encoded information may include, but not be limited to, a remote control identifier (ID), Infrared (JR) control codes for volume and power control, a media device-remote pairing code, metadata located within a header or payload in a digitally modulated signal, etc.

In step 1014, display device 108, or a mobile device with an app 408, displays the location of the remote control 110. In one aspect, the room is represented by a simple square, rectangle or cube graphic and the location of the remote relative to a television is presented within the graphic (e.g., in 2D or 3D). In another aspect, the media system may first generate a mapping of the room and its objects (e.g., furniture) using radar or other object detection mechanisms, such as known acoustic or image based object detection systems. Once mapped, the location of the remote control 110 may be displayed on a graphical image of the mapped room and objects, again in 2D or 3D.

In step 1016, remote control 110 initiates a sleep cycle. In a first example aspect, in response to not detecting inputs from user 132 for some selectable period of time, remote control 110 initiates the sleep cycle. In a second example aspect, in response to detecting no additional inputs from user 132 for some selectable period of time, remote control 110 initiates the sleep cycle. In some aspects, the remote control 110 entering the sleep cycle places the radar transponder 900 in a sleep cycle. Alternatively, the radar transponder 900 may enter a sleep cycle upon transmitting the returned radar echo signal 916 or after completing a selectable number of repeated transmissions.

Alternative aspects may include implementation with an active antenna or an active remote control 110, a complex modulation scheme, Wi-Fi functionality, Bluetooth, or an acoustic generated signal with microphone receiver located within the remote control 110, to name a few. In the Wi-Fi or Bluetooth aspects, a chip processes the received communication signals.

In the various aspects, a secure protocol, for example, a secret (number) may be used to encrypt/decrypt the transmitted/received communication signals.

Example Computer System

Figure 11:
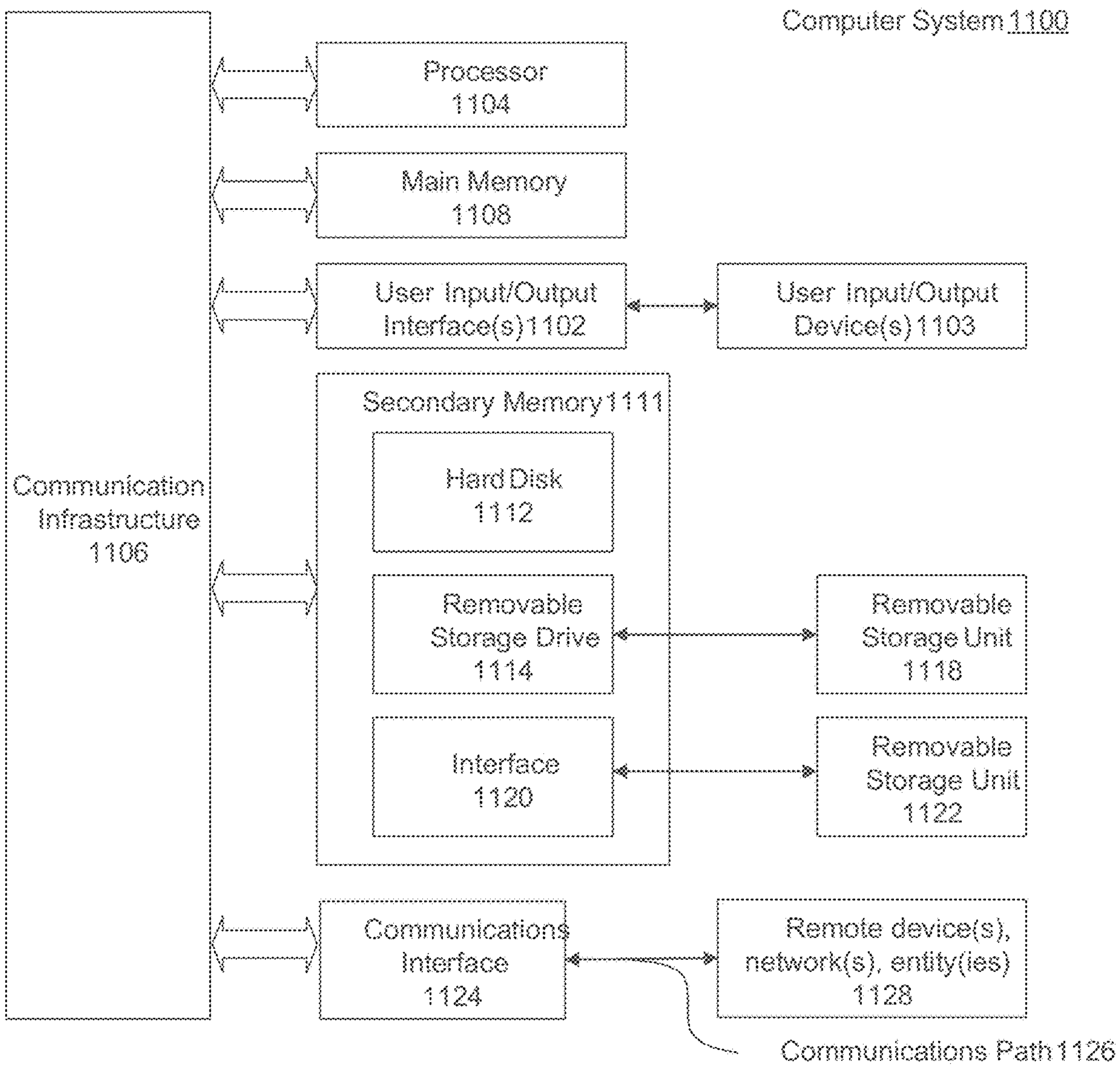
FIG. 11 illustrates an example computer system useful for implementing various aspects.

Various aspects may be implemented, for example, using one or more well-known computer systems, such as computer system 1100 shown in FIG. 11. For example, the media device 106 may be implemented using combinations or sub-combinations of computer system 1100. Also or alternatively, one or more computer systems 1100 may be used, for example, to implement any of the aspects discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics-processing unit (GPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1111. Secondary memory 1111 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit. 1118 may include a computer usable or readable storage device having stored thereon computer software (control logic) and/or data. Removable storage unit 1118 may be a floppy disk, magnetic tape, compact disk, DV), optical storage disk, and/any other computer data storage device, Removable storage drive 1114 may read from and/or write to removable storage unit 1118.

Secondary memory 1111 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML). Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1111, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 11. In particular, aspects can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A computer-implemented method for finding a remote control, comprising:

in response to the remote control receiving a modulated radio frequency signal through a tuned passive radio circuit integrated within the remote control, waking the remote control from a sleep cycle during which the remote control consumes less power than the remote control being in an awake state, the remote control being configured to control a media system comprising a display device to select and consume media content, wherein the tuned passive radio circuit includes Resistance, Inductance and Capacitance (RLC) components configured to pass a band of frequencies inclusive of at least a carrier frequency of the modulated radio frequency signal;

demodulating, by an envelope detector, the modulated radio frequency signal to extract, based on removing one or more high frequency components of the modulated radio frequency signal, an encoded radio frequency signal from the carrier frequency;

decoding the encoded radio frequency signal to generate a digital message, wherein the digital message comprises a request to locate the remote control; and responsive to the request to locate the remote control, causing the media system to generate, on the display device external to the remote control, a visual indicator to guide a user in finding a location of the remote control.

2. The computer-implemented method of claim 1, wherein a modulation scheme of the modulated radio frequency signal comprises any of:

On-Off Keying (OOK);
Frequency-Shift Keying (FSK);
Binary Phase Shift Keying (BPSK);
Amplitude-Shift Keying (ASK); or
Wireless Fidelity (WiFi).

3. The computer-implemented method of claim 1, wherein the digital message is based on a patterned representation of the request to locate the remote control.

4. The computer-implemented method of claim 1, wherein the visual indicator comprises:

an aural indicator, wherein the aural indicator is a sound generated by the remote control and wherein the sound may be varied in volume or frequency of repetition.

5. The computer-implemented method of claim 1, wherein the request to locate the remote control is sent from the display device.

6. The computer-implemented method of claim 1, wherein the receiving the modulated radio frequency signal is based on any of:

a manually activated push button;
a motion of the user proximate to a television;
a presence of the user proximate to the television;
a request from a mobile device;

television software;

media device software, or a request from a voice assistant.

7. A system, comprising:

one or more memories; and at least one processor each coupled to at least one of the memories and configured to perform operations comprising:

in response to receiving a modulated radio frequency signal through a tuned passive radio circuit integrated within a remote control, waking the remote control from a sleep cycle during which the remote control consumes less power than the remote control being in an awake state, the remote control being configured to control a media system comprising a display device to select and consume media content, wherein the tuned passive radio circuit includes Resistance, Inductance and Capacitance (RLC) components configured to pass a band of frequencies inclusive of at least a carrier frequency of the modulated radio frequency signal;

demodulating, by an envelope detector, the modulated radio frequency signal to extract, based on removing one or more high frequency components of the modulated radio frequency signal, an encoded radio frequency signal from the carrier frequency;

decoding the encoded radio frequency signal to generate a digital message, wherein the digital message comprises a request to locate the remote control; and responsive to the request to locate the remote control, causing the media system to generate, on the display device external to the remote control, a visual indicator to guide a user in finding a location of the remote control.

8. The system of claim 7, wherein the tuned passive radio circuit integrated within the remote control comprises a band-pass filter (BPF) comprising the RLC components tuned by selection of individual R, L and C component values.

9. The system of claim 8, wherein the BPF is operative with a transceiver of the remote control.

10. The system of claim 7, wherein the tuned passive radio circuit integrated within the remote control further comprises a passive Printed Circuit Board (PCB) trace antenna to receive the modulated radio frequency signal.

11. The system of claim 7, wherein a modulation scheme of the modulated radio frequency signal comprises any of:

On-Off Keying (OOK);

Frequency-Shift Keying (FSK);

Binary Phase Shift Keying (BPSK);

Amplitude-Shift Keying (ASK); or

Wireless Fidelity (WiFi).

12. The system of claim 7, wherein the digital message is based on a patterned representation of the request to locate the remote control.

13. A non-transitory computer-readable medium having instructions stored thereon that, when executed by at least one computing device, cause the at least one computing device to perform operations comprising:

in response to receiving a modulated radio frequency signal through a tuned passive radio circuit integrated within a remote control, waking the remote control from a sleep cycle during which the remote control consumes less power than the remote control being in an awake state, the remote control being configured to control a media system comprising a display device to select and consume media content, wherein the tuned passive radio circuit includes Resistance, Inductance and Capacitance (RLC) components configured to pass a band of frequencies inclusive of at least a carrier frequency of the modulated radio frequency signal;

demodulating, by an envelope detector, the modulated radio frequency signal to extract, based on removing one or more high frequency components of the modulated radio frequency signal, an encoded radio frequency signal from the carrier frequency;

decoding the encoded radio frequency signal to generate a digital message, wherein the digital message comprises a request to locate the remote control; and responsive to the request to locate the remote control, causing the media system to generate, on the display device external to the remote control, a visual indicator to guide a user in finding a location of the remote control.

14. The non-transitory computer-readable medium of claim 13, wherein a modulation scheme of the modulated radio frequency signal comprises any of:

On-Off Keying (OOK);

Frequency-Shift Keying (FSK);

Binary Phase Shift Keying (BPSK);

Amplitude-Shift Keying (ASK); or

Wireless Fidelity (WiFi).

15. The non-transitory computer-readable medium of claim 13, wherein the digital message is based on a patterned representation of the request to locate the remote control.

16. The non-transitory computer-readable medium of claim 13, wherein the visual indicator comprises:

an aural indicator, wherein the aural indicator is a sound generated by the remote control and wherein the sound may be varied in volume or frequency of repetition.

17. The non-transitory computer-readable medium of claim 13, wherein the request to locate the remoted control is sent from the display device.

* * * * *